United States Patent [19]

Monden

[11] Patent Number: 4,518,409
[45] Date of Patent: May 21, 1985

[54] METHOD OF AND APPARATUS FOR MAKING A PARISON

[75] Inventor: Norbert Monden, Auetal, Fed. Rep. of Germany

[73] Assignee: Hermann Heye, Obernkirchen, Fed. Rep. of Germany

[21] Appl. No.: 526,159

[22] Filed: Aug. 24, 1983

[30] Foreign Application Priority Data

Aug. 31, 1982 [DE] Fed. Rep. of Germany ....... 3232288

[51] Int. Cl.³ .............................................. C03B 11/10
[52] U.S. Cl. ........................................... 65/79; 65/81; 65/124; 65/215; 65/242; 65/263; 65/301; 65/307
[58] Field of Search ...................... 65/79, 81, 102, 124, 65/215, 229, 242, 263, 268, 300, 301, 307

[56] References Cited

U.S. PATENT DOCUMENTS

| | | | |
|---|---|---|---|
| 688,924 | 12/1901 | Blair et al. | 65/79 |
| 1,972,717 | 9/1934 | Schutz | 65/79 |
| 4,251,253 | 2/1981 | Becker et al. | 65/267 |
| 4,276,073 | 6/1981 | Northup | 65/77 |
| 4,336,050 | 6/1982 | Northup | 65/82 |
| 4,411,681 | 10/1983 | Northup | 65/77 |

Primary Examiner—Robert Lindsay
Attorney, Agent, or Firm—Michael J. Striker

[57] ABSTRACT

A parison is molded from a gob of molten glass by first increasing the volume of the interior of a cup-shaped main mold body by an extra volume. Then the molten-glass gob is inserted through an upper opening into the interior of the main mold body. A neck mold comprising a split neck ring is closed on the main mold body so that the neck mold and the main mold body together define a mold cavity partly formed by the interior of the main mold body. A plunger is inserted through the neck mold down into the gob in the mold cavity to displace molten glass and shape the gob into a parison. The extra volume of the interior of the main mold body is then decreased to zero at the latest until the time at which the parison is finished, so that the molten glass rises in the mold cavity up to a level above the top of the main mold body. Finally the parison thus formed is de-molded. It is therefore possible to put a relatively large gob in the main mold body without any possibility of it overflowing, and the mold cavity can be shaped more like the finished hollow glass article, so that the resultant parison can be blown into a higher-quality product.

12 Claims, 6 Drawing Figures

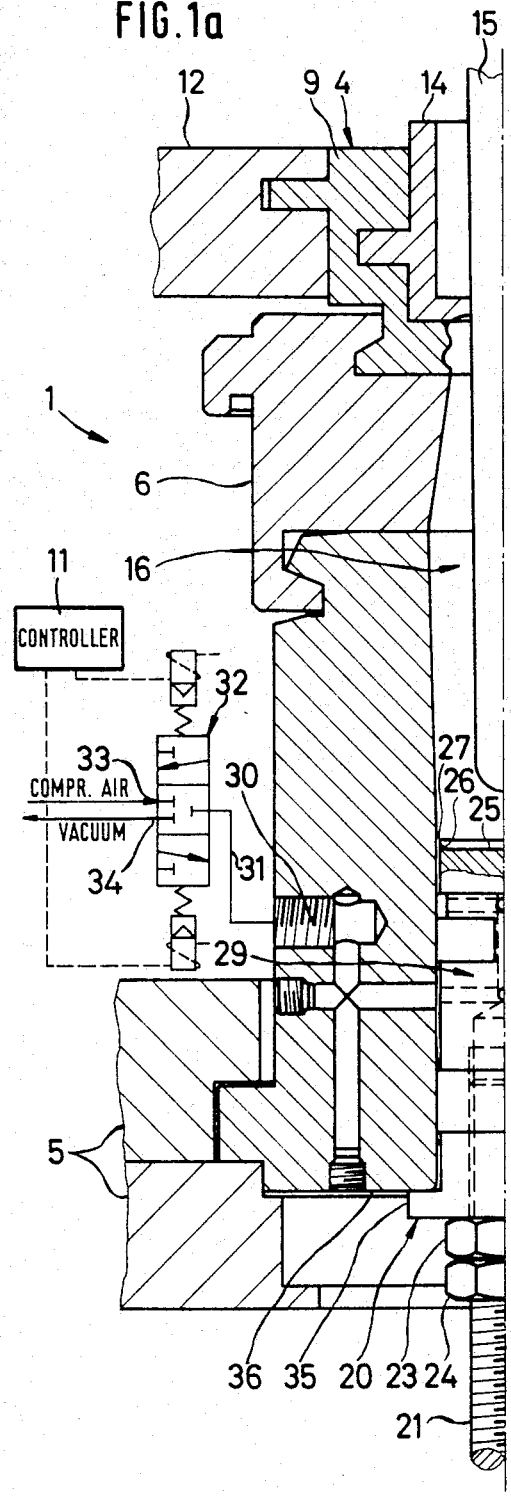
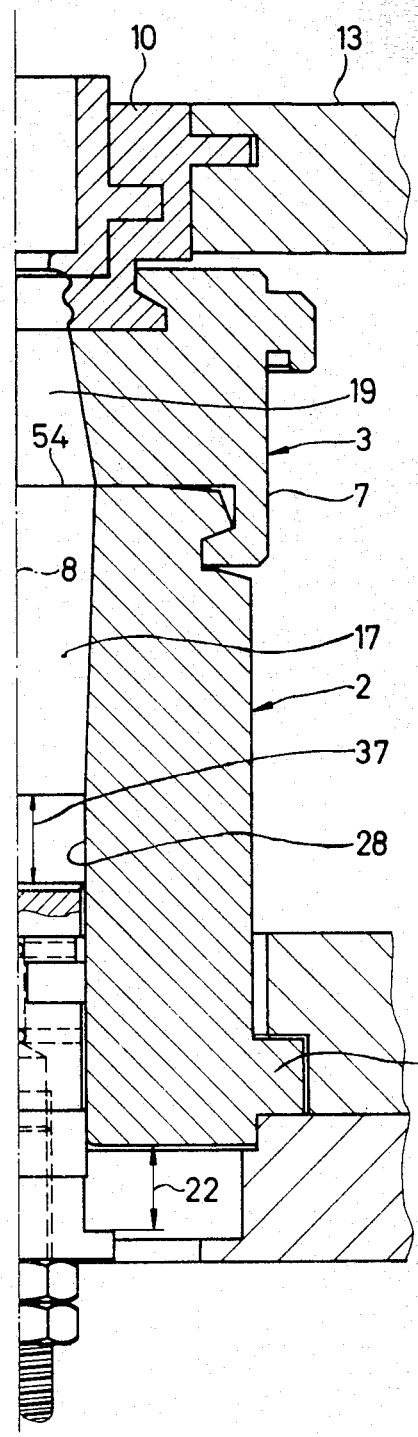
FIG. 1a
FIG. 1b

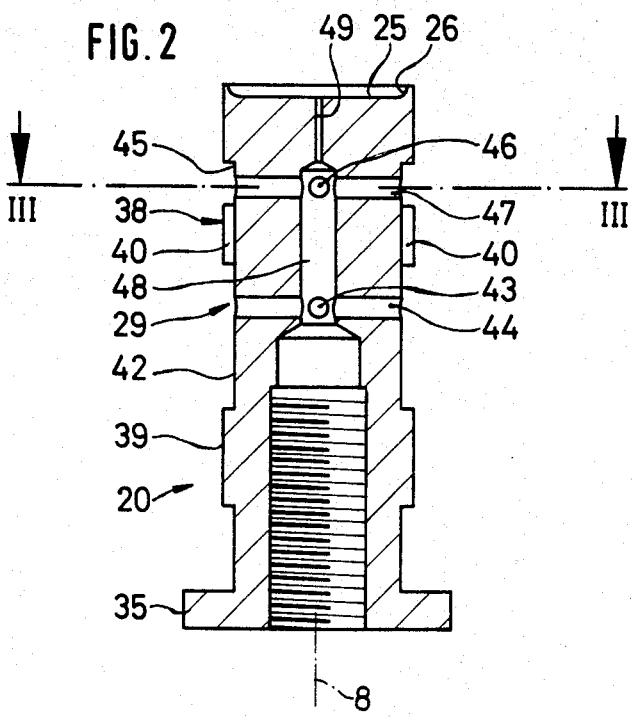

METHOD OF AND APPARATUS FOR MAKING A PARISON

FIELD OF THE INVENTION

The present invention relates to a method of and apparatus for making a parison. More particularly this invention concerns the molding of a parison from which a glass bottle is blow molded.

BACKGROUND OF THE INVENTION

It is known from U.S. Pat. No. 4,251,253 to form a blow-molding parison by dropping a glob of molten glass into the cup-like main mold body of the parison mold. Then a split mold middle piece and a neck mold are closed on the upper end of the main mold body. A plunger is then thrust down through the neck mold and the glass is pressed against the inner walls of a mold cavity of the parison mold formed by the main mold body, mold middle piece, and neck mold. The volume of the interior of the main mold body is constant. The gob volume may not be greater than said constant volume. Otherwise glass would overflow, get between the parts of the parison mold and make a mess of the equipment, or remain on the finished parison as enlarged seams or "wings", causing a product reject. Especially the bridging of the space between the neck diameter to the uppermost or loading diameter of the upper opening of the main mold body is critical. The resulting parison tends to be too thick in the shoulder region, making formation of a bottle of uniform wall thickness impossible.

In U.S. Pat. No. 4,336,050 the parison mold is provided with a piston and various complex structure that must be operated in a particular sequence. In addition many parts of the machine are kept in contact with the molten glass for quite some time, so they wear out and degrade rapidly.

OBJECTS OF THE INVENTION

It is therefore an object of the present invention to provide an improved method of and apparatus for molding a parison.

Another object is the provision of a parison-molding system which overcomes the above-given disadvantages, that is which produces a parison from which a finished hollow glass article of almost perfectly uniform wall thickness can be blown.

SUMMARY OF THE INVENTION

A parison is molded from a gob of molten glass according to the invention by first increasing the volume of the interior of a cup-shaped main mold body by an extra volume. Then the molten-glass gob is inserted through an upper opening into the interior of the main mold body. A neck mold comprising a split neck ring is closed on the main mold body so that the neck mold and the main mold body define a mold cavity partly formed by the interior of the main mold body. A plunger is inserted through the neck mold down into the gob in the mold cavity to displace molten glass and shape the gob into a parison. The extra volume of the interior of the main mold body is then decreased to zero at the latest until the time at which the parison is finished so that the molten glass rises in the mold cavity up to a level above the top of the main mold body. Finally the parison thus formed is demolded.

With this arrangement it is therefore possible to put a relatively large gob in the main mold body without any possibility of it overflowing. In addition it is possible to shape the mold cavity more like the finished hollow glass article, so that the resultant parison can be blown into a high-quality product. After closing the entire parison mold the extra volume is reduced and finally becomes zero, whereby molten glass will be fed beyond the uppermost parting plane of the main mold body into the remainder of the mold cavity.

This system works with parison molds having a split middle mold part and a neck mold, or with an arrangement wherein only a neck mold sits directly atop the annularly continuous main mold body. In this latter event the invention is of particular advantage when the neck mold normally could not be sufficiently filled with molten glass. This is, for instance, true if for achieving a parison bottom of relatively great thickness the plunger is inserted into the mold cavity only a relatively small distance, or if the neck of the parison and the finished hollow glass article has a relatively great volume. In these instances the reduction of the extra volume to zero yields an increased axial upward flow of the molten glass which is necessary to achieve the desired shape of the parison.

If, on the other hand, a mold middle piece is employed between the main mold body and the neck mold, the extra volume likewise offers considerable advantages in designing the contour of the mold cavity in the region of the mold middle piece. Especially too fast increases of the glass cross sectional areas from the neck until the upper or loading diameter of the main mold body can be avoided. In the prior art undesirable glass accumulations have been experienced in this region, which are technologically unfavourable in many respects. Above all considerable heat energy is stored in this region, which during the further processing of the parison can lead to premature reheating and undesirable flowing of the parison wall in this region. The extra volume allows the freedom necessary for an optimum change of the parison wall thickness in the axial direction. optimum transitions from the neck cross section to the loading cross section of the main mold body can thus be created. Particularly a greater axial length of the mold middle piece can be used, which so far could not be realized.

The extra volume can be decreased to zero before the plunger touches the gob in the mold cavity. This kind of operation requires only relatively little energy for the reduction of the extra volume to zero.

Faster cycling of the apparatus is, however, possible when the extra volume is reduced to zero as the plunger pushes through the gob.

To control the temperature of the parison mold and particularly the mold bottom, a gas is introduced under superatmospheric pressure into the interior of the main mold body. This gas is removed from the mold cavity before the extra volume has been decreased to zero. In addition direct contact between the gob and the bottom or the main mold body is prevented for a predetermined period of time by said gas for keeping low the temperature of said bottom, which will yield a much longer service life from this part of the arrangement. This will also allow greater freedom in the design of the bottom which upon removal of said gas is shaping the bottom of the parison.

The apparatus according to this invention therefore comprises a cup-shaped main mold body having an interior, an upper opening and a bottom part movable between an upper position corresponding to a relatively small volume of the interior and a lower position corresponding to a relatively great starting volume of the interior, the volume difference representing said extra volume. Means is provided for inserting the molten-glass gob through the upper opening into the interior of the main mold body while it is of the relatively great volume. At least a neck mold comrising a split neck ring is closable on the main mold body to define therewith a mold cavity partly formed by the interior of the main mold body. Control means connected to the bottom part decreases to zero the extra volume of the interior of the main mold body so that the molten glass rises in the mold cavity up to a level above the top of the main mold body and later on increases the volume of the interior of the main mold body by the extra volume generally back to the relatively great starting volume. A plunger is moveable through the neck mold down into the mold cavity and back out again. Means are provided for pushing the plunger down into the gob in the mold cavity to shape the gob into a parison and for pulling the plunger back out of the mold cavity. The bottom part may, for instance, be driven via a rod through a cam-cam follower system or through a piston-cylinder unit. The bottom part may be raised and lowered during the working cycle with any required accuracy. In addition a split mold middle piece may be used.

The main mold body is formed with a cylindrical opening receiving the bottom part and defining therewith a circumferential gap surrounding the bottom part. In addition means is provided for feeding a gas into the mold cavity through the gap and for withdrawing the gas from the mold cavity through the gap. As the gas is fed in it cools the parison mold and pushes up the gob, and as it is drawn out it pulls the gob down onto the mold bottom part so it exactly conforms to same. The great viscosity of the molten glass prevents it from being sucked back into the narrow gap from which the gas is drawn.

The gas feeding means comprises a passage network of the bottom part, the network being constantly connected with a passage in the wall of the main mold body, and the passage being selectively closable or connectable to a source of compressed gas or connectable to vacuum.

The passage network includes at least one small-diameter bore in the bottom part opening into the mold cavity. Several such bores could be used to further improve and accelerate the aeration and deaeration of the mold cavity. The gas preferably is air.

In addition the bottom part may be formed as a piston slidably received in the cylindrical opening and having two axially spaced guide means guided at an inner wall of the cylindrical opening, at least a lower one of the guide means sealingly engaging the inner wall, the space between the guide means forming part of the passage network. This radially guides the piston and assures gastight sealing at least in the region of the lower guide means.

DESCRIPTION OF THE DRAWING

The above and other features and advantages will become more readily apparent from the following, reference being made to the accompanying drawing in which:

FIGS. 1a and 1b are axial sections through the parison mold according to this invention with the piston in the advanced and retracted positions;

FIG. 2 is an axial section through the piston of FIGS. 1a and 1b;

FIG. 3 is a cross section taken along line III—III of FIG. 2; and

SPECIFIC DESCRIPTION

Figure 4A:
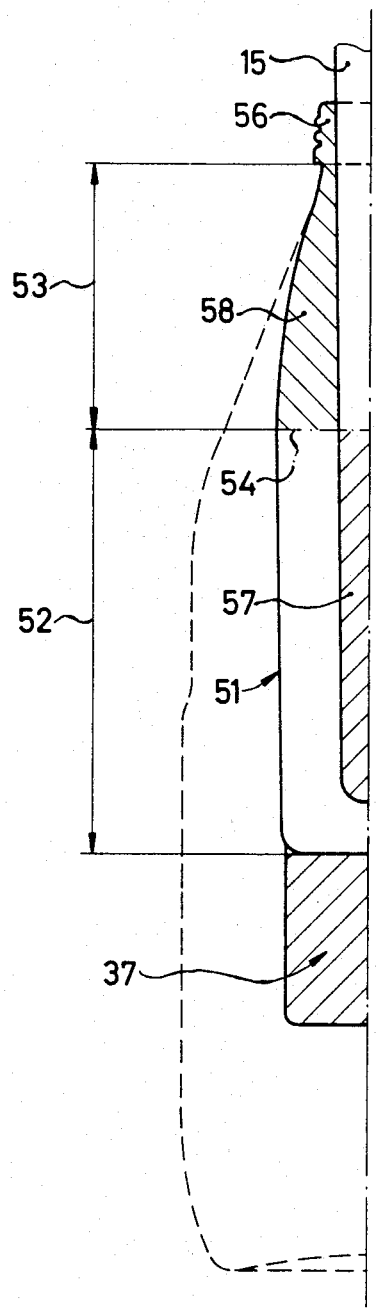
FIGS. 4a and 4b are axial sections through a parison according to the instant invention and to the prior art.

As seen in FIG. 1a parison mold 1 has a main mold body 2 that is centered on an axis 8 and not split therealong, that is it is annularly continous. A mold middle piece 3 also centered on the axis 8 can sit atop the main mold body 2. This piece 3 is formed of two halves 6 and 7 that are carried on a standard mold-opening and -closing tongs arrangement and that fit together at a plane including the axis 8 and lying perpendicular to the view in FIG. 1. The main mold body 2 has a flanged lower end 18 seated in a support structure 5.

A neck mold 4 also centered on the axis 8 sits atop the mold middle piece 3. It comprises a split neck ring having two halves 9 and 10 carried on respective holders 12 and 13 displaceable relative to each other perpendicularly to the axis 8. In addition this neck mold 4 is fitted with an unsplit guide ring 14 centered on the axis 8 and held by the neck ring halves 9 and 10. A plunger 15 is guided by this ring 14 in its axial movement into and out of the parison mold 1.

The parison mold 1 constituted by the parts 2, 3, and 4 forms a mold cavity 16 that is centered on the axis 8 and whose upper portion 19 is formed by the mold middle piece 3 and neck mold 4 and whose lower portion is formed by a slightly upwardly flared bore 17 in the main mold body 2. The main mold body 2 is further formed centered on the axis 8 with a cylindrical bore 28 forming a downward extension of the lower cavity portion 17.

A piston 20 is axially displaceable in the bore 28 through a vertical stroke 22 and has a piston rod 21 extending axially down out of the parison mold 1. Lock nuts 23 and 24 secure the rod 21 to the piston 20 so that the height position of the piston 20 relative to the piston rod 21 can be adjusted. The lifting and lowering drive (not shown) for the piston rod 21 can in a manner known per se be controlled in accordance with the operational cycle.

As best seen in FIGS. 1 and 2 the piston 20 has an upper end face that is dished, having a central recess 25 circumferentially terminating in a rounded rim 26. The diameter of the piston 20 at least at its upper end is smaller that that of the bore 28 to form an axially extending annular gap or passage 27 therewith. A passage network 29 inside the piston 20 constantly communicates with a passage 30 opening in the bore 28 and connected via a line 31 to a three-port three-position valve 32 which is also connected to a compressed-air line 33 and to a vacuum line 34. This valve 32 is provided with solenoids operated by a controller 11 for pressurization, depressurization, or sealing-off of the line 31 and thereby the mold cavity 16.

The piston 20 has as shown in FIGS. 2 and 3 a pair of axially spaced guide means 38 and 39, the former of which being axially slotted and the latter of which being annularly continuous, that keep it centered in the bore 28. Air can pass through grooves 41 formed between four ring segments 40 of the upper guide means 38, these grooves 41 forming part of the passage network 29. The lower guide means 39 has a gastight fit in the bore 28. The piston 20 is formed with a radially outwardly open groove 42 between the guide means 38 and 39, and perpendicular and diametrally throughgoing bores 43 and 44 traverse the piston 20 at the level of this groove 42.

Another groove 45 of the passage network 29 is formed in the piston 20 above the guide means 38, and bores 46 and 47 like the bores 43 and 44 traverse the piston 20 at this level too. A large-diameter bore 48 extending along the axis 8 interconnects the bores 43, 44, 46, and 47. As an alternative to FIG. 1, a small-diameter axial bore 49 of e.g. 0.7 mm. diameter of the passage network 29 extends in FIG. 2 from the upper axial end of the large-diameter axial bore 48 to the center of the recess 25. If need be further bores like bore 49, all forming part of the passage network 29, may open into recess 25.

At the start of a molding cycle the piston 20 is in the lower position shown in FIG. 1b. The upper mold parts 3 and 4 are out of the way of a gob of molten glass which is then dropped into the interior of the mold part 2 not rising above a parting plane 54 between the mold parts 2 and 3. The slide valve 32 is up as seen in FIG. 1a to feed compressed air through the passage 30 and passage network 29 to the mold cavity 16 with the effect of cooling the piston 20 and the parison mold and of simultaneously forming an air cushion and downwardly confining the incoming mass of molten glass. This will at first substantially prevent direct contact between the piston 20 and the gob and reduce the thermal load on the piston.

Then the mold parts 3 and 4 are closed on the main mold body 2 and the piston 20 is advanced upward through part or all of the stroke 22 until in the upper end positon its flange 35 abuts against a lower face 36 of the body 2. This action pushes the gob up in the cavity 16 to partly extend above the parting plane 54.

Just before the piston 20 reaches its uppermost position, in the extreme with the flange 35 abutting the face 36 of the main mold body 2, the valve 32 is switched to the opposite end position, with the vacuum line 34 connected via the passages 29 and 30 to the mold cavity 16. This sucks the molten-glass mass into tight contact with the upper surface 25, 26 of the piston 20 and with the remainder of the mold cavity 16. While the piston 20 is moving upward or after it has reached its uppermost position, the plunger 15 is urged axially downwardly in place to form a parison as indicated at 51 in FIG. 4a.

Of course, the piston 20 need not be moved fully into the uppermost position before it is stopped. It is, therefore, possible to vary the volume of the cavity 16. Assuming that the plunger 15 in each parison making cycle is urged downwardly to a constant lowermost operating position, the variable actual volume of the respective gob will dictate the upper end position of the piston 20.

Figure 4B:
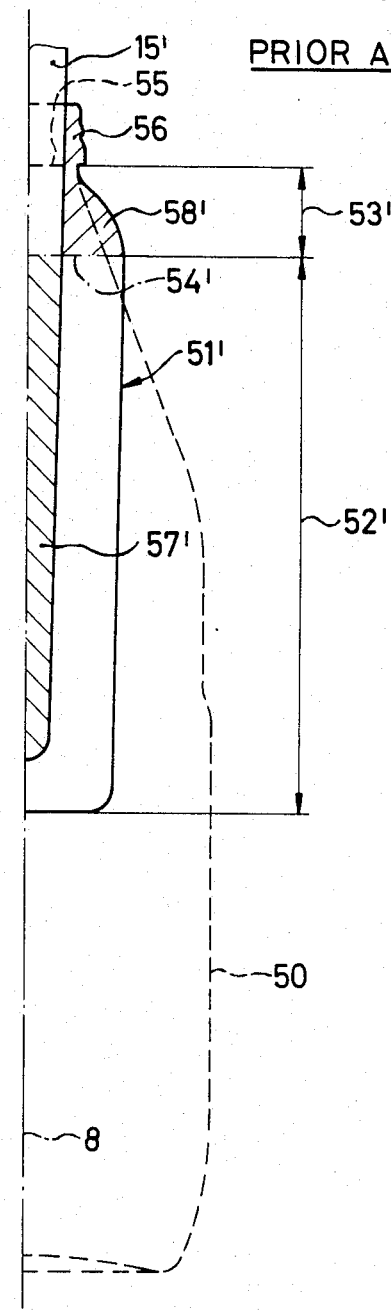

FIGS. 4a and 4b respectively show a parison 51 according to this invention and a prior-art parison 51', with the final shape of the finished hollow glass article to be made therefrom indicated in dashed lines at 50.

The parison 51 of this invention has a lower portion 52 that is formed in the the lower portion 17 of the cavity 16 only in main mold body 2 and an upper portion 53 that is formed in the upper cavity portion 19 in the split mold middle piece 3. The axial length of the portion 52 is less than twice that of the portion 53, with the parting plane 54 between the mold parts 2 and 3 lying in the middle third of the parison 51. At its top the parison 51 has a neck 56 formed by the neck mold 4 and lying above a parting plane 55 between the mold parts 3 and 4.

The prior-art parison 51' according to FIG. 4b has a relatively short upper portion 53', as the respective parting plane 54' is much higher, yielding a proportionately longer lower portion 52'. Such a shape is used to have sufficient space in the main mold body 2 to accomodate the entire gob therein without overflowing. This forms a shoulder 58' which is of greater radial thickness than the opposite shoulder 58 according to this invention. In fact the mass of molten glass is bellied out in this shoulder 58' clearly beyond the contour of the finished article 50. Such extra thickness is not wanted in the parison in this region as it leads to an unsatisfactory wall thickness distribution in the shoulder area of the finished article 50. In addition in this prior art arrangement the volume of the portion 57' of the plunger 15 below the plane 54' must be equal to the sum of the volumes of the neck 56 and the shoulder 58'. Since in the prior art one is often unable to insert the plunger 15' all the way in the parison mold 1, undesirable glass concentrations in the region of the bottom of the parison 51' and correspondingly too large wall thicknesses of the bottom of the finished glass article 50 will result.

With the system of this invention, however, the sum of the volumes of the neck 56 and the shoulder 58 is equal to the sum of the volumes of the portion 57 of the plunger 15 below the plane 54 and the extra volume 37. This extra volume 37 makes it possible for the plunger 15 to enter the main mold body 2 only with a relatively small portion 57. Nevertheless the volume of the shoulder 58 in the mold middle piece 3 can advantageously be made relatively great with the axial length 53 of the mold middle piece 3 being correspondigly advantageously great. The result is a perfect parison 51 for the respective shape of the finished article 50, with an optimally slow increase in cross section of the parison 51 in the area of the mold middle piece 3 from the neck 56 to the parting plane 54. This considerably facilitates further processing of the parison 51 into the finished article 50.

The result according to the invention is a nearly perfectly uniform wall thickness in virtually any normal hollow glass article. It is therefore possible to eliminate the use of extra material necessary when the wall thickness varies within a relatively wide range. An article manufactured according to this invention can weigh less than a prior-art article of equal strength and safety.

By means of the vertical movement of the piston 20 the extra volume 37 has been defined, by which the volume of the cavity portion 17 of the main mold body 2 is increased prior to insertion of the gob. Thus, the cavity portion 17 is enlarged and can accommodate a greater glass volume as is possible with the prior art which does not dispose of a variable volume of the cavity portion of the main mold body.

It will be understood that each of the steps and elements described above or two or more together, may also find a useful application in other types of constructions differing from the types described above.

While the invention has been illustrated and described as embodied in specific examples of operational phases of a method of and apparatus for making a glass parison, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of making a parison from a gob of molten glass, the method comprising the steps of sequentially:
   increasing the volume of the interior of a cup-shaped main mold body by an extra volume;
   inserting the molten-glass gob through an upper opening into the volume-increased interior of the main mold body;
   closing a split neck ring forming a neck mold at the opening above the main mold body on the main mold body so that the neck mold and the main mold body define a mold cavity partly formed by the interior of the main body;
   inserting a plunger through the neck mold down into the gob in the mold cavity to displace the molten glass and shape the gob into a parison and decreasing to zero the extra volume of the interior of the main mold body so that the molten glass rises in the mold cavity up above the main mold body; and
   demolding the parison thus formed.

2. The parison-making method defined in claim 1 wherein after the insertion of the gob into the interior of the main mold body a split mold middle piece is closed on the main mold body between the main mold body and the neck mold, the mold middle piece participating in defining the mold cavity.

3. The parison-making method defined in claim 1 wherein the extra volume is decreased to zero before the plunger touches the gob in the mold cavity.

4. The parison-making method defined in claim 1 wherein the plunger already touches the gob in the mold cavity while the extra volume is being decreased to zero.

5. The parison-making method defined in claim 1, further comprising the steps of:
   introducing a gas under superatmospheric pressure into the interior of the main mold body; and
   removing the gas from the mold cavity before the extra volume has been decreased to zero.

6. The parison-making method defined in claim 1 wherein the gas is introduced between a bottom of the main mold body and the gob.

7. An apparatus for molding a parison from a gob of molten glass, apparatus comprising:
   a cup-shaped main mold body having an interior, an upper opening and a bottom part movable between an upper position corresponding to a relatively small volume of the interior and a lower position corresponding to a relatively great starting volume of the interior, the volume difference representing an extra volume;
   means for inserting the molten-glass gob through the upper opening into the interior of the main mold body while the interior thereof is of the relatively great volume;
   at least a neck mold comprising a split neck ring closable on the main mold body to define therewith a mold cavity partly formed by the interior of the main mold body;
   control means connected to the bottom part for decreasing to zero the extra volume of the interior of the main mold body so that the molten glass rises in the mold cavity up to a level above the top of the main mold body and for increasing the volume of the interior of the main mold body by the extra volume generally back to the relatively great starting volume;
   a plunger moveable through the neck mold down into the mold cavity and back out again; and
   means for pushing the plunger down into the gob in the mold cavity to shape the gob into a parison and for pulling the plunger back out of the mold cavity.

8. The parison-molding apparatus defined in claim 7, further comprising
   a split mold middle piece closable on the main mold body between the main mold body and the neck mold and participating in defining the mold cavity.

9. The parison-molding apparatus defined in claim 7 wherein the main mold body is formed with a cylindrical opening receiving the bottom part and defining therewith a circimferential gap surronding the bottom part, the apparatus further comprising:
   means for feeding a gas into the mold cavity through the gap and for withdrawing the gas from the mold cavity through the gap.

10. The parison-molding apparatus defined in claim 9 wherein the feeding means comprises a passage network of the bottom part, the passage network being constantly connected with a passage in the wall of the main mold body, and the passage being selectively closable or connectable to a source of compressed gas or connectable to vacuum.

11. The parison-molding apparatus defined in claim 10 wherein the passage network includes at least one small-diameter bore in the bottom part opening into the mold cavity.

12. The parison-molding apparatus defined in claim 10 wherein the bottom part is formed as a piston slidably received in the cylindrical opening and having two axially spaced guide means guided at an inner wall of the cylindrical opening, at least a lower one of the guide means sealingly engaging the inner wall, the space between the guide means forming part of the passage network.

* * * * *